United States Patent [19]

Kozuki et al.

[11] Patent Number: 4,879,609
[45] Date of Patent: Nov. 7, 1989

[54] ROTARY HEAD TYPE RECORDING APPARATUS HAVING AN ERASING FUNCTION BASED ON RECORDING MODE

[75] Inventors: Susumu Kozuki, Tokyo; Koji Takahashi, Kanagawa; Keiji Satoh, Tokyo; Kenichi Nagasawa, Kanagawa; Hiroo Edakubo, Tokyo; Mitsuhiro Otokawa, Kanagawa, all of Japan

[73] Assignee: Canon Kabushiki Kaisha, Tokyo, Japan

[21] Appl. No.: 277,479

[22] Filed: Nov. 23, 1988

Related U.S. Application Data

[63] Continuation of Ser. No. 870,617, Jun. 4, 1986, abandoned.

[30] Foreign Application Priority Data

Jun. 13, 1985 [JP] Japan ................................. 60-128560

[51] Int. Cl.[4] .......................... G11B 5/02; G11B 15/14
[52] U.S. Cl. ....................................... 360/66; 360/61; 360/64
[58] Field of Search ....................... 360/61, 64, 65, 66, 360/118

[56] References Cited

U.S. PATENT DOCUMENTS

| | | | |
|---|---|---|---|
| 4,274,116 | 6/1981 | Ida ........................................ | 360/65 |
| 4,300,174 | 11/1981 | Harmon et al. ....................... | 360/66 |
| 4,486,792 | 12/1984 | Edakubo et al. ...................... | 360/64 |
| 4,520,405 | 5/1985 | Sasaki et al. .......................... | 360/65 |
| 4,616,273 | 10/1986 | Ishii et al. ............................. | 360/66 |
| 4,622,614 | 11/1986 | Yamashita et al. ................... | 360/66 |
| 4,656,533 | 4/1987 | Sakai et al. ............................ | 360/65 |

Primary Examiner—Alan Faber
Assistant Examiner—Surinder Sachar
Attorney, Agent, or Firm—Robin, Blecker, Daley & Driscoll

[57] ABSTRACT

A rotary head type recording apparatus according to the present invention can record information signals on a tape-shaped magnetic recording medium based on a plurality of kinds of recording modes in which track pitches are different from each other, and the track pitches of the recording tracks formed on the taped-shaped magnetic recording medium are varied depending on the kinds of the recording modes and at the same time a pattern of a signal-for-erasion supplied to a rotary type erasing head with wider width in the direction perpendicularly crossing a tracing direction of the head than that of a rotary type magnetic head is varied depending on the kinds of the recording modes, so that the undesirable influence of the signal-for-erasion over the recording of the information signals is reduced and at the same time power consumption is also reduced.

8 Claims, 4 Drawing Sheets

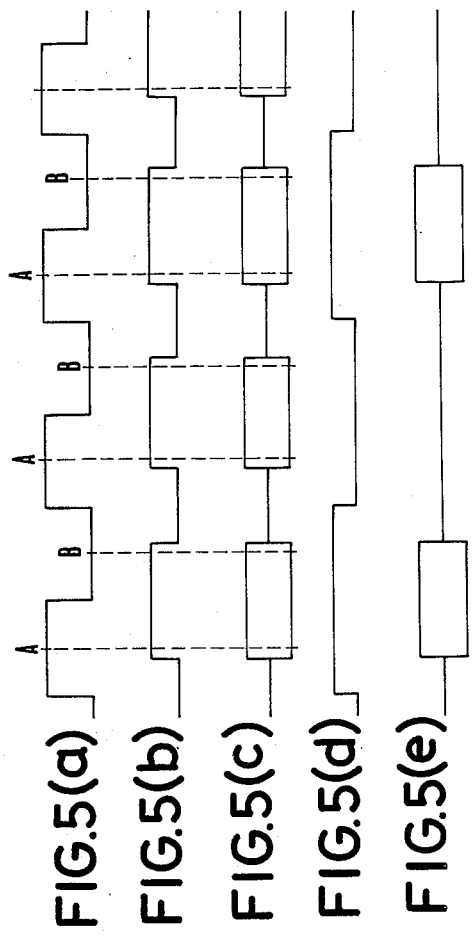
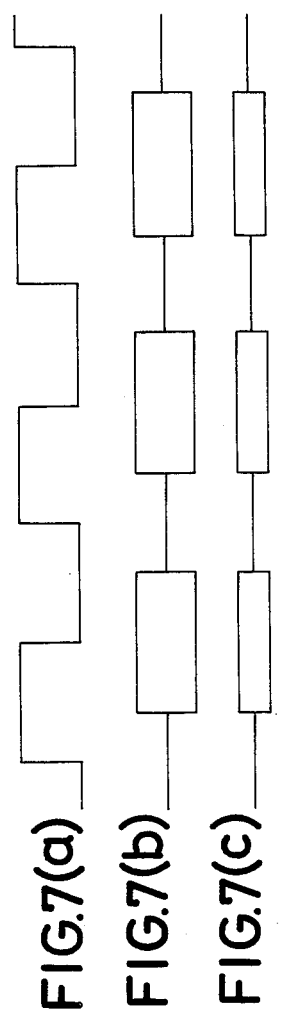

ROTARY HEAD TYPE RECORDING APPARATUS HAVING AN ERASING FUNCTION BASED ON RECORDING MODE

This application is a continuation, of application Ser. No. 870,617, filed Jun. 4, 1986.

BACKGROUND OF THE INVENTION

1. Field of the Invention

This invention relates to rotary head type recording apparatus, and more particularly to such apparatus which records informations or video signals on a tape-shaped recording medium along oblique lines by a rotating head.

2. Description of the Related Art

A typical example of the recording apparatus of this kind is the video tape recorder (VTR). Recently, the trend of VTRs toward the reduction of the size and the increase of the recording density has advanced until a magnetic tape of 8 mm. width is usable, or a so-called 8 mm. VTR is available in the market.

Such a light weight VTR has a high frequency of outdoor use. So, this leads to an earnest desire for an editing capability that allows so-called cuts or erasions and subsequent insertions to be performed. To this end, a rotary erasing head has come to be used, because the failure of leaving unerased the part which was intended to be erased is less than when a stationary erasing head is used.

Furthermore, to realize increased recording density, use has been made of magnetic tapes with a high coercive force referred to as metal tapes. In order to erase this type magnetic tape, the current to the rotary erasing head must be increased.

Aiming at a further increase in the recording density, another kind of VTR has been developed that enables two or more different pitches to be selectively set. In such a recorder, particularly when the recording is performed with the narrow pitch, the amount of consumed electrical power by the erasing current is caused to increase.

Another problem arising from the reduction of the size of the drum is the increased possibility of leakage of the erasing current to another head through a rotary transformer. This leakage reduces the quality of the reproduced picture when the picture is recorded in tracks of narrow pitch.

SUMMARY OF THE INVENTION

An object of the present invention is to eliminate the above-described problems.

Another object is to lessen the adverse effect of the erasing signal by using simple means.

Still another object is to reduce the consumption of electrical power of the apparatus by constructing it in a simpler form.

Under such objects, according to one embodiment of the present invention, it is proposed to provide for the rotary head type recording apparatus for recording information or signals with running drive means for driving the running of a tape-shaped magnetic recording medium, a rotary type erasing head for erasing the aforesaid tape-shaped magnetic recording medium while tracing in an oblique direction to the running direction of the aforesaid tape-shaped magnetic recording medium, a rotary type magnetic head for tracing the aforesaid tape-shaped magnetic recording medium in the same direction as that in which the aforesaid rotary type erasing head has traced, running speed changeover means for changing over the running speed of the aforesaid tape-shaped magnetic recording medium by controlling the aforesaid running drive means, signal-for-erasion generating means for generating a signal for erasion and supplying the aforesaid signal for erasion to the aforesaid rotary type erasing head and signal-for-erasion changeover means for changing over the generation pattern of the signal for erasion generated by the aforesaid signal-for-erasion generating means in response to the running speed of the aforesaid tape-shaped magnetic recording medium changed over by the aforesaid running speed changeover means.

Other objects than those described above of the invention and its features will become apparent from the following detailed description of embodiments thereof by reference to the drawings.

BRIEF DESCRIPTION OF THE DRAWINGS

FIGS. 5(a) to 5(e) are timing charts illustrating a manner in which the VTR of FIG. 1 operates.

FIGS. 7(a) to 7(c) are timing charts illustrating a manner in which the VTR of FIG. 6 operates.

DETAILED DESCRIPTION OF THE PREFERRED EMBODIMENTS

Figure 1:
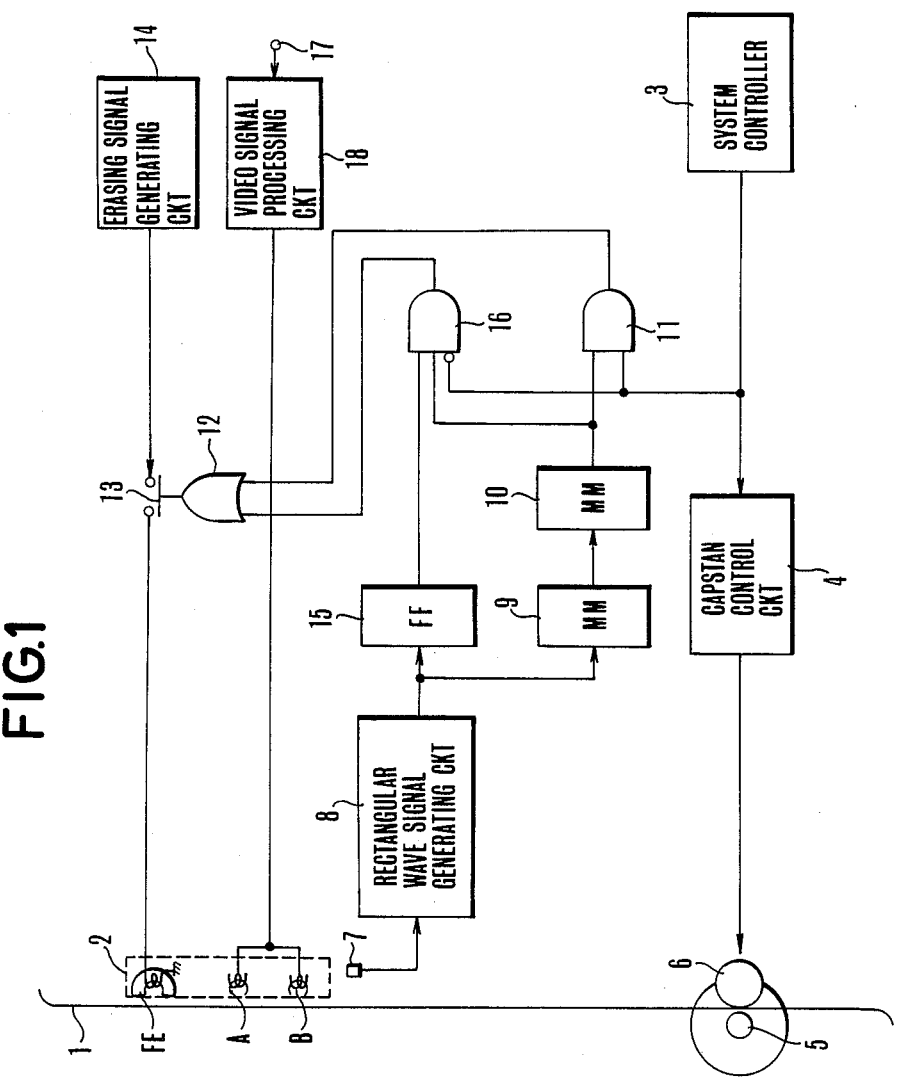
FIG. 1 is a schematic view illustrating the outline of the construction of an embodiment of the VTR according to the present invention.

The present invention is next described in connection with embodiments thereof. Referring to FIG. 1, the VTR of the invention includes a rotary drum 2 around which a magnetic tape 1 is wound. Two recording heads A and B and a rotatable erasing head FE are mounted on the rotary drum 2.

Figure 2:
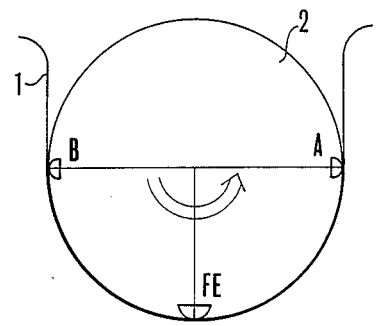
FIG. 2 is an elevation view illustrating a head arrangement in the VTR of FIG. 1.

FIG. 2 illustrates the arrangement of the heads A, B and FE on the drum 2 in the VTR shown in FIG. 1. As shown in the figure, the recording heads A and B are displaced from each other with a phase difference of 180°, and the rotary erasing head FE is positioned with a phase difference of 90° from either of the recording heads A and B.

Figure 3:
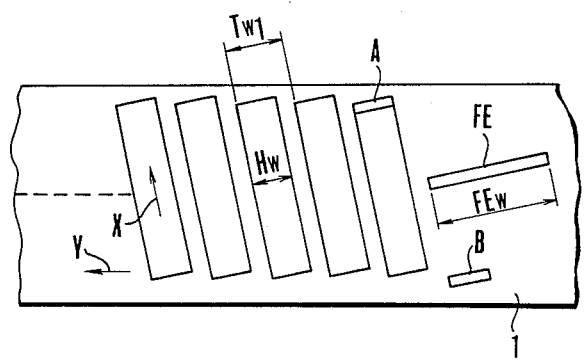
FIGS. 3 and 4 are diagrams illustrating the recorded patterns by the VTR of FIG. 1.
Figure 4:
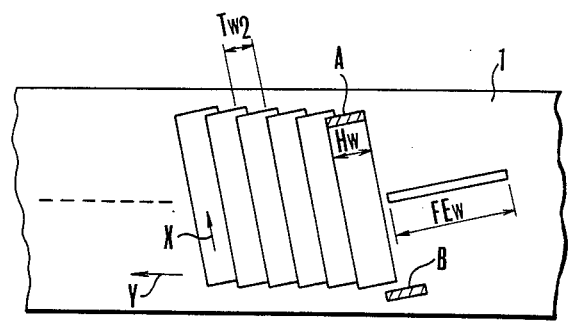

FIGS. 3 and 4 illustrate what track patterns are formed on the magnetic tape 1 by the VTR of FIG. 1 when two different modes with a wide track pitch Tw1 and a narrow track pitch Tw2 are operated respectively. These modes will be hereinafter called "SP" and "LP" modes respectively. Now assuming that Tw1 is 2 times as wide as Tw2, then the width (FEw) of the rotary erasing head FE is required to be equal to or more than 2 times as wide as Tw1. Hence, it takes a value of not less than 4 times the Tw2. For note, Hw denotes the width of each of the heads A and B.

Now, when in the SP recording mode, a system controller 3 supplies a signal of high level (Hi) to a capstan control circuit 4, thereby the speed of rotation of a capstan 5 is determined so that the tape 1 moves a distance equal to 2Tw1 during the time when the rotary drum 2 rotates one revolution. A pinch roller 6 is pressed against the capstan 5.

Responsive to rotation of the drum 2, a detector 7 produces an output which is shaped to a rectangular wave signal shown in FIG. 5(a) by a circuit 8. This rectangular wave repeats at a frequency with its one period made equal to the period of one revolution of the rotary drum 2 and is changed to such a rectangular wave as shown in FIG. 5(b) in passing through a monostable multivibrator (MM) 9 which is triggered by the rising edge and another monostable multivibrator (MM) 10 which is triggered by the falling edge. The output of the MM10 when in SP mode is applied through an AND gate 11 and an OR gate 12 to control an analog switch 13.

An erasing signal produced from an erasing signal generating circuit 14 is supplied through the analog switch 13 to the rotary erasing head 2. It is, therefore, in the SP mode that the erasing current takes such a waveform as shown in FIG. 5(c).

Video signals entering a terminal 17 after having made a form suited to be recorded by a signal processing circuit 18 are recorded by the heads A and B in one track for every one field on that area of the tape 1 which was erased by the head FE.

In this connection it should be explained that in the SP mode, the rotary erasing head FE erases two or more tracks at a time and this occurs once for every two field periods, and that as shown in FIG. 3, the erasing head FE leads both recording heads A and B, when each track is erased. For note, in FIGS. 3 and 4, X indicates the tracing direction of the head, and Y the running direction of the tape.

In the LP mode, on the other hand, the system controller 3 produces a signal of low level (Lo). Responsive to this signal, the capstan control circuit 4 renders the capstan 5 to rotate at a speed of ½ times that of the SP mode. Also, the output of the AND gate 11 is changed to and maintained at Lo. But, the AND gate 16 produces an output representing the logic product of the output of the MM10 (shown in FIG. 5(b)) and the output of a flip-flop (FF) 15 (shown in FIG. 5(d)) whose frequency is ½ times that of the output of the rectangular wave signal generating circuit 8. The output of the AND gate 16 is applied through the OR gate 12 to control the analog switch 13 in such a manner that the erasing head FE is supplied with pulsated currents as shown in FIG. 5(e).

It should be pointed out here that through the current flows once for every four field periods, the erasing head FE can erase all tracks.

The VTR of the kind described above has advantages that the required amount of current for erasion in the LP is reduced to ½ times that of the SP in respect to the period, and a common erasing head can be used in both SP and LP modes, in other words, the electrical energy consumption is halved, and the structure of construction can be simplified.

Another advantage is that in the LP mode, because the period of flow of the erasing current is reduced to ½ times that of the SP mode, the opportunity of giving a bad influence to the recorded signals by the crosstalk of the rotary transformer is also halved. Thus, an improvement of the quality of the recorded signals on the erased portions of the tape can be achieved.

Figure 6:
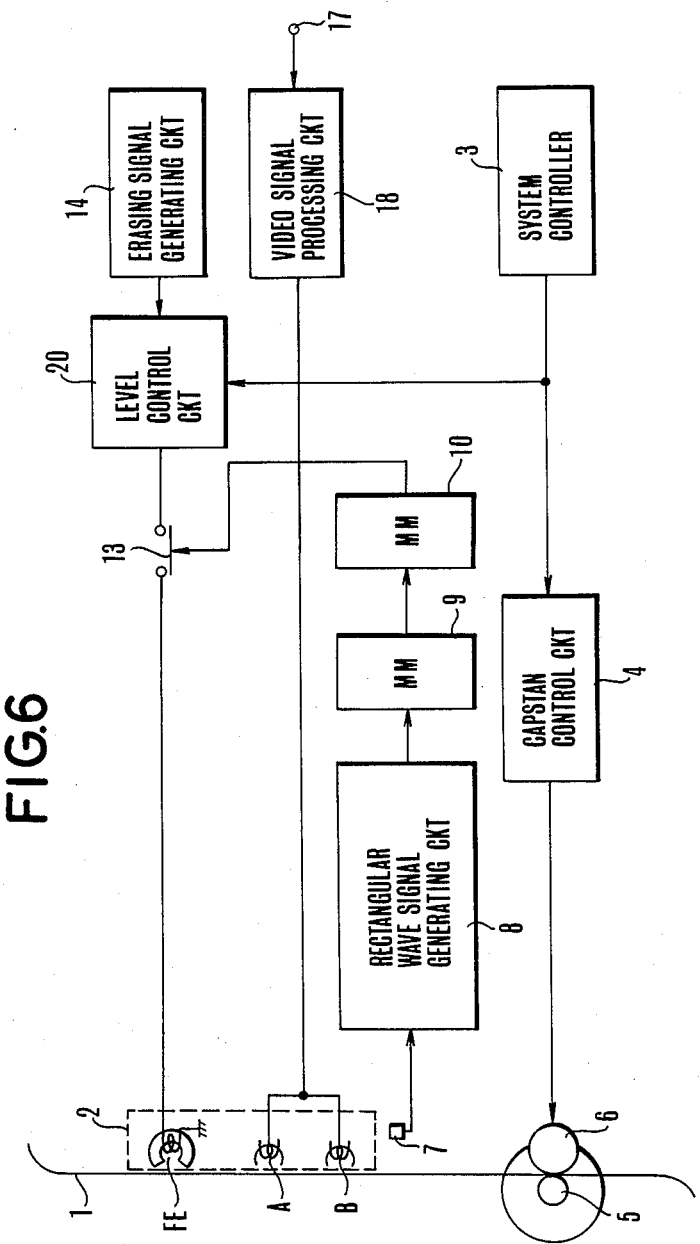
FIG. 6 is a schematic view illustrating the construction of another embodiment of the VTR according to the present invention.

FIG. 6 illustrates another embodiment of the VTR according to the invention, where the same reference numerals have been employed to denote the similar parts to those shown in FIG. 1. The SP mode of the VTR of FIG. 6 operates in exactly the same manner as with the VTR of FIG. 1, where the erasing current supplied to the erasing head FE is shown in FIG. 7(b). For note, FIG. 7(a) shows the output of the rectangular wave signal generating circuit 8.

It is, however, in the LP mode that though the analog switch 13 is operated in a similar manner to that of the SP mode by the output of the MM 10, the erasing signal is halved in potential by a level control circuit 20. This design is based on the conception that, because the opportunity of erasion by the erasing head FE is twice for each track, a half of the erasing current of the SP mode in each pulse suffices for the complete erasion in the LP mode.

Even in the VTR of FIG. 6, it is a matter of course that the amount of leaked erasing current is reduced and therefore, the bad influence on the recorded signals is lowered.

The number of recording heads and erasing head and their arrangement are not essential to the invention. Various modifications of the embodiments of the invention described above may be made. For example, even when the present invention is applied to another type VTR having different recording heads with different modes, or SP and LP, similar satisfactory results can be attained.

As has been described above, the rotary head type recording apparatus according to the invention has achieved a possibility of reducing the bad influence of the erasing current on the signals to be recorded, and lowering the consumption of electrical energy.

What is claimed is:

1. A rotary head type recording apparatus which can record information signals on a tape-shaped magnetic recording medium based on a plurality of kinds of recording modes in which relative speeds of said tape-shaped magnetic recording medium and a recording head are different from each other, comprising:
    (A) running drive means for driving a tape-shaped magnetic recording medium;
    (B) a rotary type erasing head for performing erasion by tracing said tape-shaped magnetic recording medium in an oblique direction with respect to the running direction of said tape-shaped magnetic recording medium;
    (C) a rotary type magnetic head for tracing said tape-shaped magnetic recording medium in the same direction as that traced by said rotary type erasing head;
    (D) running speed changeover means for controlling said running drive means depending on the kinds of said recording modes and changing over the running speed of said tape-shaped magnetic recording medium;
    (E) signal-for-erasion generating means for intermittently generating a signal for erasion and supplying said signal for erasion to said rotary type erasing head; and
    (F) control means for varying an output cycle of said signal for erasion generated by said signal-for-erasion generating means, depending upon said kinds of said recording modes.

2. An apparatus according to claim 1, wherein said recording modes include a high speed mode in which the running speed of said tape-shaped magnetic recording medium is at a first speed, and a low speed mode in which the running speed is at a second speed less than said first speed.

3. An apparatus according to claim 2, wherein said control means is arranged to control said signal-for-erasion generating means in such a manner that when said recording mode is the high speed mode, a signal for erasion is produced in a first cycle from said signal-for-erasion generating means and when said recording mode is the low speed mode a signal for erasion is produced in a second cycle, which is longer than said first cycle, from said signal-for-erasion generating means.

4. An apparatus according to claim 2, wherein said running speed changeover means is arranged so that the running speed of said tape-shaped magnetic recording medium when in said high speed mode becomes n times the running speed of said low speed mode, and said control means is arranged to control said signal-for-erasion generating means in such a manner that when in the high speed mode said signal-for-erasion generating means produces said signal for erasion in a cycle equal to n times of that of said low speed mode.

5. A rotary head type recording apparatus which can record information signals on a tape-shaped magnetic recording medium based on a plurality of kinds of recording modes with such track pitches of recording tracks as being different from each other so that recording tracks with a plurality of kinds of track pitches can be formed, comprising:

(A) recording track formation control means for controlling the track pitches of said recording tracks formed on said tape-shaped magnetic recording medium depending on the kinds of said recording modes;

(B) a rotary type magnetic head to trace said tape-shaped magnetic recording medium in an oblique direction to the advancing direction of said tape-shaped magnetic recording medium;

(C) a rotary type erasing head to trace said tape-shaped magnetic recording medium in the same direction as that traced by said rotary type magnetic head and whose width perpendicular to the tracing direction of the head is wider than that of said rotary type magnetic head;

(D) signal-for-erasion generating means for intermittently generating a signal for erasion, and supplying said signals for erasion to said rotary type erasing head; and (E) control means for varying the output cycle of said signal for erasion generated by said signal-for-erasion signal generating means, depending upon said kinds of said recording modes.

6. An apparatus according to claim 5, wherein said recording modes include a wide track pitch mode in which the track pitch of said recording track is a first width, and a narrow track pitch mode in which the track pitch of the recording track is a second width less than the first width.

7. An apparatus according to claim 6, wherein said control means is arranged to control said signal-for-erasion generating means in such a manner that when said recording mode is the wide track pitch mode, a signal for erasion is produced in a first cycle from said signal-for-erasion generating means, and when in the narrow track pitch mode a signal-for-erasion is produced in a second cycle, which is longer than said first cycle, from said signal-for-erasion generating means.

8. An apparatus according to claim 6, wherein said recording track formation control means is arranged so that the track pitch of the recording track formed when in said wide track pitch mode becomes n times the track pitch of the recording track of said narrow track pitch mode, and said control means is arranged to control said signal-for-erasion generating means in such a manner that when in the wide track pitch mode, said signal for erasion is produced in a cycle equal to n times of that of said narrow track pitch mode from said signal-for-erasion generating means.

* * * * *